(12) United States Patent
Imfeld et al.

(10) Patent No.: US 10,367,384 B2
(45) Date of Patent: Jul. 30, 2019

(54) TORQUE-OPTIMIZED ROTOR AND SMALL ELECTRIC MOTOR WITH A ROTOR OF THIS TYPE

(71) Applicant: Lakeview Innovation Ltd., Buochs (CH)

(72) Inventors: Stefan Imfeld, Giswil (CH); Heinz Wagner, Kerns (CH)

(73) Assignee: LAKEVIEW INNOVATION LTD., Buochs (CH)

( * ) Notice: Subject to any disclaimer, the term of this patent is extended or adjusted under 35 U.S.C. 154(b) by 296 days.

(21) Appl. No.: 15/291,809

(22) Filed: Oct. 12, 2016

(65) Prior Publication Data
US 2017/0110919 A1     Apr. 20, 2017

(30) Foreign Application Priority Data

Oct. 15, 2015 (EP) .................................. 15002941

(51) Int. Cl.
*H02K 1/27* (2006.01)
*H02K 1/02* (2006.01)
(Continued)

(52) U.S. Cl.
CPC ............. *H02K 1/2706* (2013.01); *H02K 1/02* (2013.01); *H02K 1/2773* (2013.01); *H02K 1/30* (2013.01); *H02K 15/03* (2013.01); *H02K 2213/03* (2013.01)

(58) Field of Classification Search
CPC ...... H02K 1/2706; H02K 1/02; H02K 1/2773; H02K 1/30; H02K 15/03; H02K 2213/03
See application file for complete search history.

(56) References Cited

U.S. PATENT DOCUMENTS 3,979,821 A * 9/1976 Noodleman ......... H02K 13/006
                                                                29/598
5,829,120 A * 11/1998 Uchida ................ H02K 1/2773
                                                                29/598
(Continued)

FOREIGN PATENT DOCUMENTS

CN     103580325 A    2/2014
CN     104871403 A    8/2015
(Continued)

OTHER PUBLICATIONS

Office Action (First Office Action) and Search Report dated May 29, 2018, by the Chinese Patent Office in corresponding Chinese Patent Application No. 201610894201.X, and an English Translation of the Office Action. (23 pages).

*Primary Examiner* — Mohamad A Musleh
(74) *Attorney, Agent, or Firm* — Buchanan Ingersoll & Rooney PC

(57) ABSTRACT

A rotor for a small electric motor (e.g., electric engine). The rotor having a rotor axis, multiple permanent magnets that are arranged in a spoke-shaped way as well as several inference cores. Each of the permanent magnets has two axial ends, two longitudinal sides, a radial outer side as well as a radial inner side. The inference cores protrude radially over the permanent magnets in relation to the rotor axis. The rotor is enclosed at least partially by a casting mold having multiple struts that extend in an axial direction and that overlap radially with the permanent magnets. The inference cores do not overlap with the permanent magnets on their radial outer sides, wherein both the permanent magnets as well as the inference cores are held together primarily directly by the casting mold in a radial direction.

16 Claims, 3 Drawing Sheets

Figure 1:
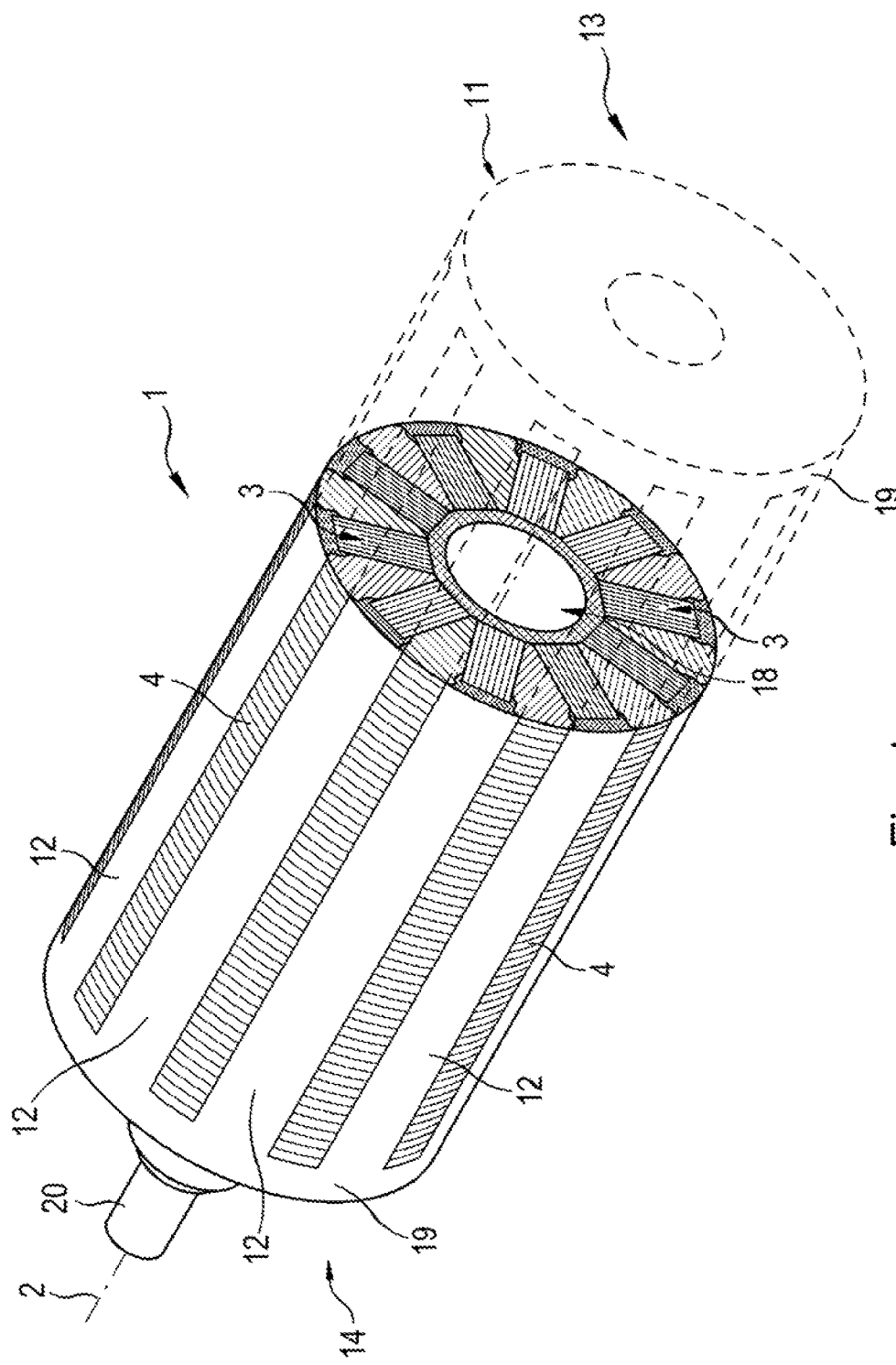

(51) Int. Cl.
*H02K 1/30* (2006.01)
*H02K 15/03* (2006.01)

(56) References Cited

U.S. PATENT DOCUMENTS

| | | | | |
|---|---|---|---|---|
| 6,144,130 | A * | 11/2000 | Kawamura | H02K 1/278 |
| | | | | 310/156.12 |
| 6,144,132 | A * | 11/2000 | Nashiki | H02K 1/2713 |
| | | | | 310/152 |
| 6,392,324 | B1 * | 5/2002 | Kuwahara | H02K 1/2773 |
| | | | | 310/156.11 |
| 8,922,083 | B2 * | 12/2014 | Asahi | H02K 1/2706 |
| | | | | 310/156.08 |
| 9,178,394 | B2 | 11/2015 | Asahi et al. | |
| 9,991,769 | B2 * | 6/2018 | Furutachi | H02K 5/20 |
| 10,069,357 | B2 | 9/2018 | Ekin et al. | |
| 2010/0301695 | A1 * | 12/2010 | Yamada | H02K 1/2746 |
| | | | | 310/156.01 |
| 2013/0057103 | A1 | 3/2013 | Han et al. | |
| 2013/0061640 | A1 | 3/2013 | Kim et al. | |
| 2013/0061641 | A1 * | 3/2013 | Yoon | H02K 1/148 |
| | | | | 68/140 |
| 2013/0106208 | A1 * | 5/2013 | Yamada | H02K 1/2706 |
| | | | | 310/43 |
| 2013/0187486 | A1 * | 7/2013 | Lee | H02K 5/02 |
| | | | | 310/43 |
| 2013/0207507 | A1 * | 8/2013 | Han | H02K 15/03 |
| | | | | 310/216.007 |
| 2014/0042834 | A1 | 2/2014 | Asahi et al. | |
| 2015/0022042 | A1 | 1/2015 | Han et al. | |
| 2015/0295460 | A1 | 10/2015 | Ekin et al. | |
| 2016/0352199 | A1 * | 12/2016 | Honda | H02K 15/12 |

FOREIGN PATENT DOCUMENTS

| | | |
|---|---|---|
| DE | 10 2013 211 858 A1 | 12/2014 |
| EP | 2 568 575 A2 | 3/2013 |
| EP | 2 568 578 A2 | 3/2013 |
| EP | 2 696 470 A2 | 2/2014 |
| EP | 2 827 474 A2 | 1/2015 |
| WO | WO 8902183 A1 * | 3/1989 ............ H02K 1/2773 |

* cited by examiner

TORQUE-OPTIMIZED ROTOR AND SMALL ELECTRIC MOTOR WITH A ROTOR OF THIS TYPE

The present invention relates to a rotor for an electric motor (e.g. electric engine).

A rotor of the type according to the category has a rotor axis, several permanent magnets that are arranged in a spoke-shaped way as well as multiple inference cores. The indications "axial" and "radial" used in the following relate, if not indicated otherwise, to the rotor and/or its rotor axis. Each of the permanent magnets has two axial ends, two longitudinal sides, a radial outer side as well as a radial inner side. Respectively one of the inference cores is disposed between two adjacent permanent magnets. The inference cores have the shape of a wedge. The wedge has a radially extending plane of symmetry, two flanks, two axial ends and a radial outer side. The two flanks confine a wedge angle A towards each other. The inference cores extend slightly further to the outside in a radial direction. Therefore, they protrude radially over the permanent magnets in relation to the rotor axis. The rotor is at least partially surrounded by a so-called casting mold. This can for example be a plastic injection molding. The casting mold has several struts that extend in an axial direction and that cover the permanent magnets radially. Further, there is a form closure that acts in a radial direction between the struts and the inference cores in case of the rotor according to the category. The inference cores are individual inference cores that are not connected.

A rotor whose basic structure is equivalent to the structure of the rotor according to the category is known from the EP 2827474 A2. However, the rotor described therein differs from the subject of the generic term in that the inference cores are not individual, non-connected inference cores. Rather, the inference cores are protruding in a spoke-shaped way from a central, sleeve-shaped structure that connects the inference cores to one another on the inner circumference. The inference cores consist of a bundle of laminations that is stacked up in an axial direction. The connected design of the inference cores has the advantage that the inference cores do not have to be positioned exactly towards each other as the relative positioning of the individual cores in relation to one another has already been determined. In addition, manufacturing of the bundle of laminations is also relatively easy and cost-efficient. The inner sleeve-shaped structure of the bundle of laminations is formed through rings of the individual laminations that are stacked up. It requires additional installation space in a radial direction, making the connected design of the inference cores less suitable in case of particularly small electric motors (e.g. electric engines), especially in cases where a particularly compact structure is desired. However, the condition that a magnetic short circuit, due to which not the complete magnetic flow will be induced into the air gap towards the stator, is formed by the connection of the inference cores on the inner circumference of the rotor is a much more serious aspect.

In the rotor that is shown in EP 2827474 A2, the inference cores slightly protrude over the permanent magnets in a radial direction so that an axially extending groove-shaped recess is formed on the outer circumference of the rotor between the inference cores. The axially extending recesses are filled by the struts of a plastic injection molding so that a homogeneous cylindrical outer circumference of the rotor is formed. The radial external sides of the inference cores are uncovered in order to ensure a lowest possible radial distance between the inference cores and the poles of the stator. The permanent magnets are held on one hand by the struts of the plastic injection molding in a radial direction. The primary protection against falling out of the rotor compound due to the centrifugal forces that act onto the rotor during operation of the electric motor (e.g. electric engine), however, will be achieved by means of an overlap of the inference cores with the permanent magnets on the radial outer sides of the latter. For this purpose, respectively one rib that protrudes in the circumferential direction and that partially covers the adjacent permanent magnet on its radial outer side is formed on the radial outer end of the flanks of the inference cores.

A rotor according to the generic term is known from EP 2568578 A2. This document shows an embodiment in which the inference cores are not connected to one another on the inner circumference by means of a joint, sleeve-shaped structure. However, a sleeve, through which a connection with the rotor shaft is established, is provided on the inner circumference of the rotor also in this case. In this embodiment, the inference cores are further secured by screws that are guided through the inference cores in an axial direction. This type of fixing is only suitable for rotors with a larger diameter. Similar to the rotor known from EP 2827474 A2, the permanent magnets are primarily secured in a radial direction by an overlap of the inference cores with the permanent magnets on the radial outer sides of the latter.

Although the rotor designs described before, which are known from the state of the art, ensure a stable cohesion of the rotor, the precise technical design requires a relatively large space in a radial direction in both cases and is less suitable for the rotors of small electric motors (e.g. electric engines). Apart from this, there is a demand for torque-optimized small electric motors (e.g. electric engines). If the rotors described before, which are known from the state of the art, are used, there will be losses that will not lead to an optimal torque.

The purpose of the present invention is to indicate a rotor of the type according to the category that is suitable for a small electric motor (e.g. electric engine), that has a sufficient stability for this purpose and that ensures in addition an optimization of the torque.

There will be a solution according to the invention of the problem in case of a rotor of the type according to the category if the inference cores do not protrude over the permanent magnets at their radial outer sides, wherein both the permanent magnets as well as the inference cores are kept together in a radial direction primarily directly by the casting mold.

It has become clear that a stable cohesion of the rotor can be ensured exclusively by the plastic injection molding and/or casting mold in rotors with a small diameter. The inference cores are thereby held in a radial direction by the existing form closure between the struts of the casting mold and the inference cores. A screw joint of the inference cores by screws that extend axially through the inference cores is not required. Likewise, an inner sleeve-shaped structure, through which the inference cores are connected to one another on the inner circumference, is not necessary either. Due to this, losses, which are produced by a magnetic short circuit on the inner circumference, are prevented. The torque is further optimized in that the inference cores do not protrude over the permanent magnets on their radial outer sides. The struts of the casting mold preferably close flush with the radial outer sides of the inference cores so that a homogeneous cylindrical outer circumference of the rotor is formed. In any case, the radial outer sides of the inference cores are preferably not enclosed by the casting mold. They are preferably uncovered in order to achieve an optimal efficiency level and/or a high torque. To make sure that the casting mold can provide for a stable coherence of the rotor, the struts of the casting mold are connected to one another at least on one axial end of the rotor, preferably on both axial ends of the rotor. The connection exists preferably in a continuous ring.

In a particularly preferred embodiment of the present invention, respectively one axially extending groove is provided for the form closure between the struts and the inference cores in the flanks of the inference cores, wherein the groove has a first groove flank that is located in closer proximity to the radial outer side of the inference core as well as a second groove flank that is located further away from the radial outer side of the inference core. In this embodiment, a suitable form closure is formed in a simple way between the inference cores and the casting mold. The groove can preferably be a V-shaped groove, further preferably with a rounded groove base.

Particularly preferably, the first groove flank confines an angle B in relation to the plane of symmetry of the inference core, which is greater than half of the wedge angle A and which is equivalent to the wedge angle A as a maximum. In particular in cases where the casting mold is formed by a plastic injection molding, this embodiment ensures that the plastic will flow into the groove and thereby fills this groove completely. The wedge angle A is consequently obtained by 360° divided by the number of the permanent magnets in case such permanent magnets have a rectangular cross section. Particularly preferably, the angle B is at least 4° greater than half of the wedge angle A. Hence, the wedge angle A is 36° in case of 10 permanent magnets, and the angle B is preferably in the range between 22° and 36°. In case of 16 permanent magnets, the wedge angle A is 22.5° and the angle B is thereby preferably in the range between 15.25° and 22.5°.

In a further preferred embodiment of the present invention, the groove is located in close proximity of the axial outer side of the corresponding inference core. Particularly preferably, the groove is for example located on a radial position of the radial outer side of the adjacent permanent magnet. Due to this, a stable cohesion is provided on one hand, and on the other hand it is ensured that the plastic of the plastic injection molding can flow into the groove quickly and completely.

In a further preferred embodiment of the present invention, the first groove flank merges seamlessly into a rounding between the corresponding flank and the axial outer side of the inference core. Also in this way, the flowing behavior of the plastic is optimized. Further preferably, all visible contours of the inference core, which are perpendicular to the rotor axis in a section, are rounded in order to ensure that the casting mold fits optimally on the contour.

In a further preferred embodiment of the present invention, the contour of the flanks of the inference core between the first groove flank and the radial outer side of the inference core is located as a maximum approximately as far away from the plane of symmetry as immediately following the second groove flank. Thereby, manufacturing of the casting mold is simplified and the cohesion of the rotor is further optimized.

In a further preferred embodiment of the present invention, the casting mold also supports the permanent magnets and the inference cores radially towards the inside, wherein an internal part of the casting mold is connected to an external part of the casting mold at least on one axial end of the rotor. Particularly preferably, the connection between the internal part of the casting mold and the external part of the casting mold exists on both axial ends. Further preferably, the casting mold is a plastic injection molding.

In a further preferred embodiment of the present invention, the flanks of the inference cores are in addition glued to the respective longitudinal side of the neighboring permanent magnets that is adjacent to them. This embodiment is particularly an option for somehow larger rotors of small electric motors (e.g. electric engines) in order to ensure the stable cohesion of the rotor.

The inference cores are preferably magnetically soft bundles of laminations made of multiple stacked up metal sheet segments. The metal sheet segments are thereby aligned perpendicularly to the rotor axis. Further preferably, the metal sheet segments are punched out of a metal sheet. They are preferably insulated on both sides and further preferably connected mechanically to one another, welded by laser or glued to one another.

In a further preferred embodiment of the present invention, the permanent magnets are neodymium-iron-boron magnets. The permanent magnets are further preferably magnetized perpendicularly to the radial direction of the rotor.

Further, the invention provides a small electric motor (e.g. electric engine) with a stator and with a rotor according to the invention. The small electric motor (e.g. electric engine) preferably has a maximum diameter of 45 mm, further preferably of 22 mm as a maximum.

In a preferred embodiment, the rotor has either 10 or 14 or 16 rotor poles whereas the stator has 12 stator teeth.

An embodiment of the present invention will be explained in greater detail by means of drawings in the following.

Figure 2:
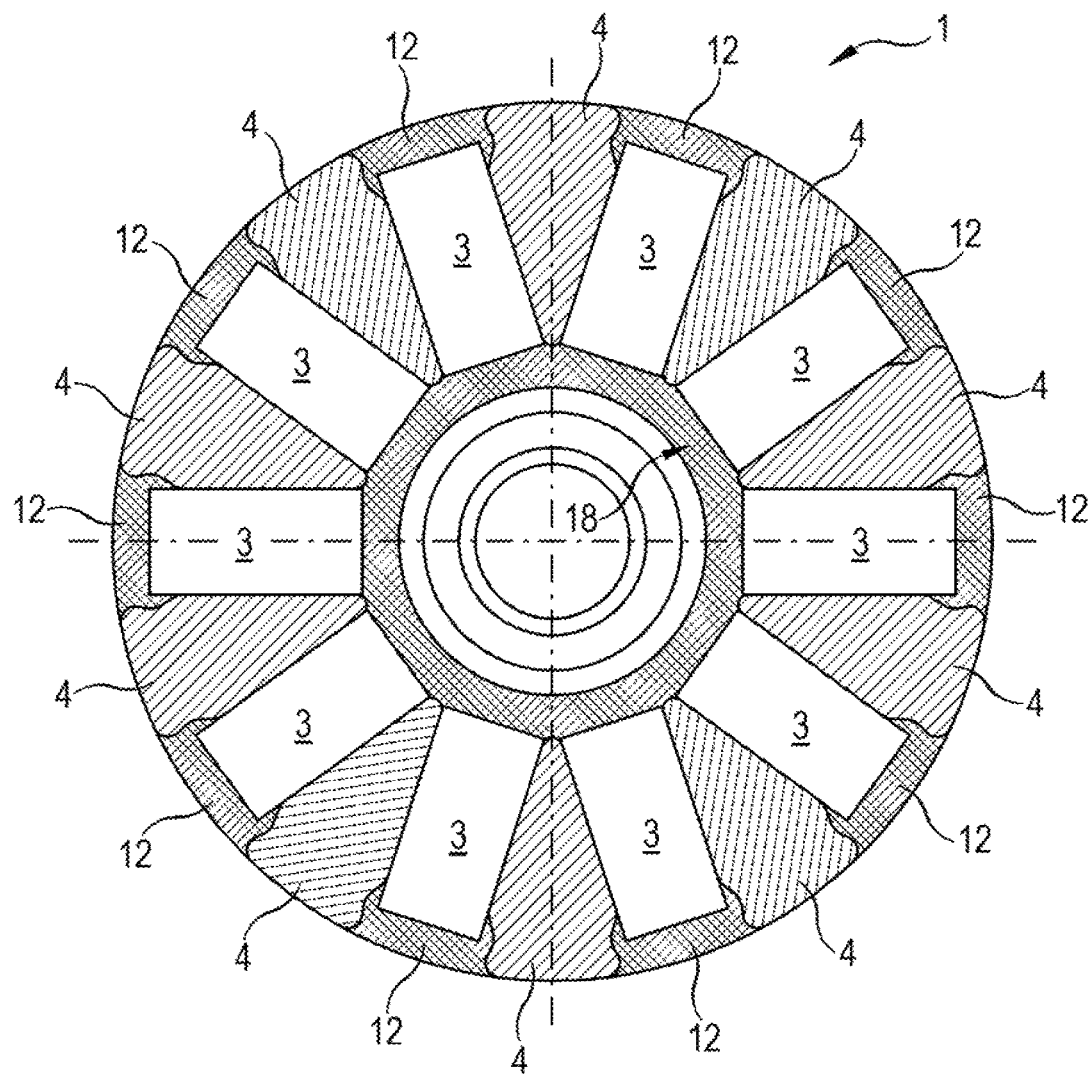

The drawings show:

FIG. 1 an oblique view of an embodiment of a rotor according to the invention,

FIG. 2 a cross-section of the rotor according to the invention from FIG. 1, and

Figure 3:
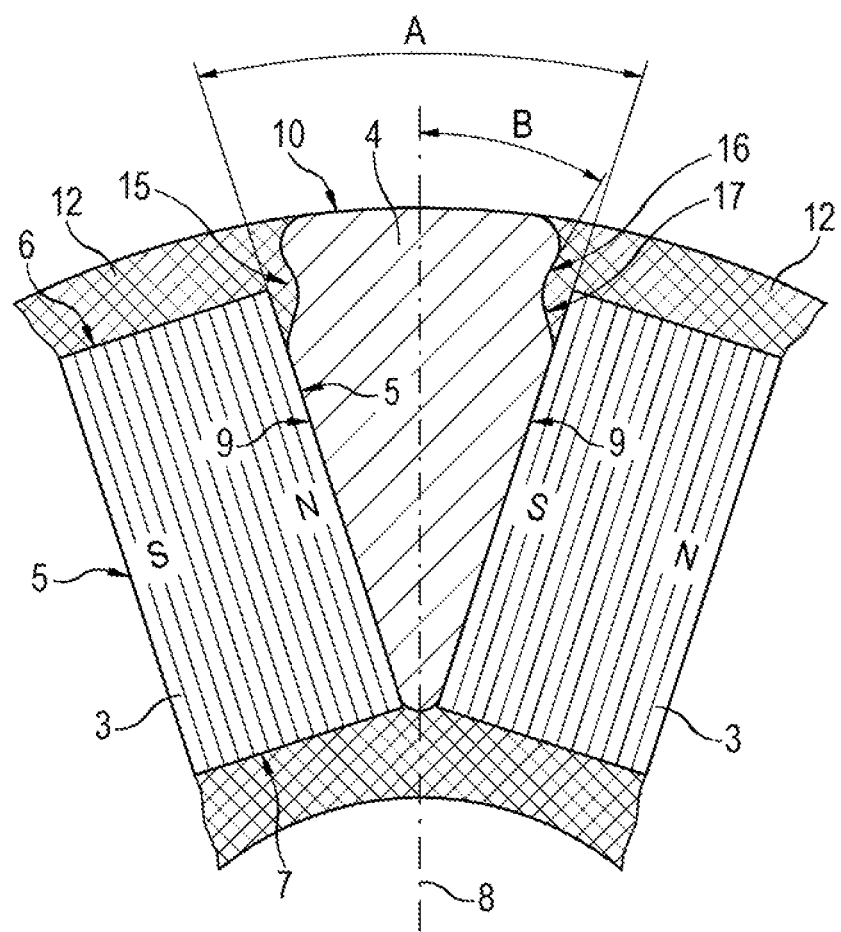

FIG. 3 a detail view of the cross-section from FIG. 2.

In the following, equal parts will be designated with equal reference signs. If reference signs are included in a Figure but not specified further in the pertaining description of figures, reference will be made to preceding or subsequent descriptions of figures.

FIG. 1 shows an oblique view of a rotor 1 according to the invention. The rotor 1 has a rotor axis 2, multiple permanent magnets 3 that are arranged in a spoke-shaped way as well as multiple inference cores 4 that are disposed in between. The rotor module that consists of the permanent magnets 3 and the inference core 4 is designed in a hollow cylindrical way and sits on a continuous shaft 20.

As shown in particular by the cross-section in FIG. 2, the rotor is designed with 10 poles. It therefore comprises a total of 10 permanent magnets 3 that are arranged over the circumference with an even distribution. The permanent magnets 3 have a rectangular cross-section. They have the longitudinal sides that are designated with the reference sign 5 in FIG. 3 and that are aligned in parallel to one another, a radial outer side 6 that is aligned perpendicularly to such longitudinal sides, as well as a radial inner side 7 that is also aligned perpendicularly to such longitudinal sides. The permanent magnets are preferably neodymium-iron-boron magnets. They are magnetized perpendicularly to the radial direction of the rotor.

Respectively one interstitial inference core 4 in form of a wedge is arranged between two adjacent permanent magnets 3. FIG. 3 shows that the wedge has a radially extending plane of symmetry 8, two flanks 9 that are disposed in a mirror-inverted way in relation to the plane of symmetry 8 as well as a radial outer side 10. The two flanks 9 confine the wedge angle A towards one another. This wedge angle is calculated to 360° divided by the number of permanent magnets. In the shown embodiment, the wedge angle A consequently amounts to 36°.

The inference cores are magnetically soft bundles of laminations consisting of multiple stacked up metal sheet segments. The metal sheet segments are punched out of a metal sheet, which is insulated on both sides, and preferably connected to one another mechanically, welded by laser or glued to one another. The individual metal sheet segments are aligned perpendicularly to the rotor axis 2.

As displayed in the Figures, the inference cores 4 slightly protrude radially over the permanent magnets 3. The gaps that are formed in this way between the inference cores 4 are filled with plastic. More precisely, the rotor module is held together by a plastic injection molding 11 that encloses the permanent magnets 3 and the inference cores 4 both on the outer circumference as well as on the inner circumference of the rotor. On the outer circumference, the plastic injection molding has multiple struts 12 that extend in an axial direction, wherein each of these struts covers respectively one of the permanent magnets 3 radially and therefore fills the gap between two adjacent inference cores 4. The struts 12 close flush with the radial outer sides 10 of the inference cores 4 so that a homogeneous cylindrical outer circumference of the rotor is formed. The radial outer sides 10 of the inference cores 4 are consequently not covered by the plastic injection molding. The struts 12 of the plastic injection molding 11 are connected to one another respectively by a ring 19 of the plastic injection molding both on the axial front end 13 as well as on the axial rear end 14 of the rotor. The two rings 19 also establish a connection to the inner part 18 of the plastic injection molding. This inner part 18 of the plastic injection molding has essentially the form of a hollow cylindrical sleeve that supports the permanent magnets 3 and the inference cores 4 radially.

The permanent magnets 3 are held by the struts 12 of the plastic injection molding that cover them directly. Therefore, the struts 12 prevent the permanent magnets 3 from moving outward due to the centrifugal forces, which emerge during operation of the electric motor (e.g. electric engine) and which impact on the rotor, and therefore deform the rotor. The struts 12 also perform this function for the inference cores 4. For this purpose, there is a form closure acting in a radial direction between the struts 12 and the inference cores 4. This form closure is realized by a groove 15 that is provided in the flanks 9 of the inference cores 4. This groove is located in close proximity to the axial outer side of the inference core, extends in an axial direction and has a first groove flank 16, which is situated in closer proximity to the radial outer side of the inference core, as well as a second groove flank 17, which is located further away from the radial outer side of the inference core.

The first groove flank confines an angle B to the plane of symmetry of the inference core, which, according to the invention, is greater than half of the wedge angle A and equivalent to the wedge angle A as a maximum. Particularly preferably, the angle B is at least 4° greater than half of the wedge angle A. In the displayed embodiment, the angle B is therefore preferably in a range between 22° and 36°. This ensures that the plastic of the plastic injection molding will flow into the groove 15 quickly and completely so that an optimal form closure is provided between the future struts 12 of the plastic injection molding and the inference cores 4.

The reliable cohesion of the rotor module and a simple process control are ensured, inter alia, also by the positioning of the groove 15. This groove is preferably located approximately on a radial position of the radial outer side 6 of the respective adjacent permanent magnet 3. The contours are rounded at least in the area of the groove to further facilitate the flow of the plastic into the groove. The first groove flank 16 therefore merges seamlessly into a rounding between the respective flank 9 and the axial outer side 10 of the inference core 4. Likewise, also the groove base of the groove 15 is rounded. To further optimize the reliable cohesion of the rotor module, the contour of the flanks of the inference core in the area between the first groove flank 16 and the radial outer side of the inference core 4 is located approximately as far away from the plane of symmetry 8 as immediately following the second groove flank 17 as a maximum.

To further reinforce cohesion, the flanks 9 of the inference cores 4 can be glued to the respective adjacent longitudinal side 5 of the neighboring permanent magnets 3. The additional gluing is in particular an option in cases where the diameter of the rotor is quite large. The invention is basically suitable for rotors for small electric motors (e.g. electric engines) with a maximum diameter of 45 mm. If the small electric motor (e.g. electric engine) has a maximum diameter of 22 mm, additional gluing can usually be omitted.

The invention claimed is:

1. Rotor for an electric motor, comprising:
a rotor axis, multiple permanent magnets that are arranged in a spoke-shaped way, and as well as multiple inference cores,
wherein each permanent magnet has two axial ends, two longitudinal sides, one radial outer side and a radial inner side,
wherein respectively one interstitial inference core formed as a wedge is disposed between two adjacent permanent magnets, wherein the wedge has a radially extending plane of symmetry, two flanks, two axial ends and a radial outer side, wherein the two flanks confine a wedge angle A towards one another,
wherein the inference cores protrude radially over the permanent magnets in relation to the rotor axis,
wherein the rotor is enclosed at least partially by a casting mold, wherein the casting mold has multiple struts that extend in an axial direction and that overlap radially with the permanent magnets,
wherein a form closure that acts in a radial direction exists between the struts and the inference cores,
and wherein the inference cores are individual inference cores that are not connected,
wherein the inference cores do not overlap with the permanent magnets on their radial outer sides, and wherein both the permanent magnets as well as the inference cores are held together primarily directly by the casting mold in a radial direction.

2. Rotor for an electric motor, comprising:
a rotor axis, multiple permanent magnets that are arranged in a spoke-shaped way, and as well as multiple inference cores,
wherein each permanent magnet has two axial ends, two longitudinal sides, one radial outer side and a radial inner side,
wherein respectively one interstitial inference core formed as a wedge is disposed between two adjacent permanent magnets, wherein the wedge has a radially extending plane of symmetry, two flanks, two axial ends and a radial outer side, wherein the two flanks confine a wedge angle A towards one another, wherein the inference cores protrude radially over the permanent magnets in relation to the rotor axis, wherein the rotor is enclosed at least partially by a casting mold, wherein the casting mold has multiple struts that extend in an axial direction and that overlap radially with the permanent magnets, wherein a form closure that acts in a radial direction exists between the struts and the inference cores, and wherein the inference cores are individual inference cores that are not connected, wherein the inference cores do not overlap with the permanent magnets on their radial outer sides, and wherein both the permanent magnets as well as the inference cores are held together primarily directly by the casting mold in a radial direction, wherein respectively one axially extending groove is provided for the form closure between the struts and the inference cores in the flanks of the inference cores, wherein the groove has a first groove flank, which is located in closer proximity to the radial outer side of the inference core, as well as a second groove flank that is located further away from the radial outer side of the inference core.

3. Rotor according to claim 2, wherein the first groove flank confines an angle B towards the plane of symmetry of the inference core, which is greater than half of the wedge angle A and which is equivalent to the wedge angle A as a maximum.

4. Rotor according to claim 3, wherein the angle B is at least 4° greater than half of the wedge angle A.

5. Rotor according to claim 2, wherein the groove is located approximately on a radial position of the radial outer side of the permanent magnets.

6. Rotor according to claim 2, wherein the first groove flank merges seamlessly into a rounding between the respective flank and the axial outer side of the inference core.

7. Rotor according to claim 2, wherein the contour of the flanks of the inference core is located approximately as far away from the plane of symmetry as directly following the second groove flank as a maximum.

8. Rotor according to claim 1, wherein the casting mold also supports the permanent magnets and the inference cores radially towards the inside, wherein an inner part of the casting mold is connected to an outer part of the casting mold at least on one axial end of the rotor.

9. Rotor according to claim 1, wherein the flanks of the inference cores are glued to the respective adjacent longitudinal side of the neighboring permanent magnets.

10. Rotor according to claim 1, wherein the inference cores are magnetically soft bundles of laminations made up of multiple stacked up metal sheet segments.

11. Rotor according to claim 10, wherein metal sheet segments are punched out of a metal sheet.

12. Rotor according to claim 10, wherein the metal sheet segments are insulated on both sides and preferably connected to one another mechanically, welded by laser or glued to one another.

13. Rotor according to claim 1, wherein the permanent magnets are neodymium-iron-boron magnets.

14. Small electric motor with a stator and a rotor according to claim 1, wherein the small electric motor preferably has a maximum diameter of 45 mm.

15. Electric motor according to claim 14, wherein the rotor has 10, 14 or 16 rotor poles whereas the stator has 12 stator teeth.

16. Electric motor according to claim 14, wherein the small electric motor has a maximum diameter of 22 mm.

* * * * *